United States Patent

[11] 3,580,279

| | | | |
|---|---|---|---|
| [72] | Inventor | Dale K. Harris <br> Monroe, La. | |
| [21] | Appl. No. | 786,180 | |
| [22] | Filed | Dec. 23, 1968 | |
| [45] | Patented | May 25, 1971 | |
| [73] | Assignee | Cities Service Company <br> New York, N.Y. | |

[54] LOCK AND SEAL MEANS FOR LONGITUDINALLY MOVABLE MEMBER INSERTED INTO A VESSEL
16 Claims, 6 Drawing Figs.

[52] U.S. Cl. .................................................... 137/590,
285/302, 285/322
[51] Int. Cl. ..................................................... F16l 27/12
[50] Field of Search ........................................ 137/590;
251/214; 285/302, 322, 348

[56] References Cited
UNITED STATES PATENTS
| | | | | |
|---|---|---|---|---|
| 1,191,013 | 7/1916 | McGilvray................. | | 285/302X |
| 2,339,771 | 1/1944 | Davies....................... | | 285/348X |
| 2,343,922 | 3/1944 | Parker....................... | | 285/348X |
| 3,097,866 | 7/1963 | Iversen...................... | | 285/322X |

*Primary Examiner*—William R. Cline
*Attorney*—J. Richard Geaman

ABSTRACT: In a fluid-containing vessel having a longitudinally movable elongated member which extends into the vessel through an opening in the wall thereof, means for altering the insertion distance of the member while preventing leakage of material through the wall opening. The elongated member, e.g. a conduit or probe, extends axially through a stationary housing attached to the vessel wall. The housing contains a plurality of clamping fingers for gripping the elongated member so that it is secured from longitudinal movement. The grip can be released at will for repositioning of the member. Seal means is also employed to prevent leakage of material into or out of the vessel through the wall opening.

Patented May 25, 1971

3,580,279

INVENTOR
DALE K. HARRIS
BY
ATTORNEY

LOCK AND SEAL MEANS FOR LONGITUDINALLY MOVABLE MEMBER INSERTED INTO A VESSEL

BACKGROUND OF THE INVENTION

This invention relates to means for altering the distance to which an elongated member, such as a conduit or probe, is inserted into a vessel through a wall opening, while preventing leakage of material through the opening as would be caused by a difference in pressure across the wall.

In the processing or handling of fluid materials, it is frequently desirable to insert a member such as an atomizer, thermocouple well or pitot tube into a vessel which contains the material, the member being inserted for a predetermined distance and then locked in place to secure the tip of the member in a desired position. In many instances it is also necessary that the member be longitudinally movable, for repositioning of the tip, without incurring leakage of material into or out of the vessel through the opening which accommodates insertion of the member. Although various means have been employed for repositioning the member while preventing leaks, they have not proven altogether satisfactory for one reason or another. In one system, the member is inserted into the vessel through a gland which contains a packing material that fills the space between the outer wall of the member and the inner wall of the gland. By tightening a nut which screws into the gland, the packing is compressed to seal the wall opening through which the member extends into the vessel while also squeezing the packing tightly against the member in order to lock it in place. One drawback of this technique is that excessive wrenching of the nut is required to achieve locking and subsequent release of the member. Furthermore, successful locking and sealing cannot be repeatedly achieved when using high temperature packing materials such as asbestos. Another disadvantage is that the member cannot be tightly locked into place and a seal maintained when considerable vibration exists or when the member is rather heavy and subject to displacement by the influence of gravity. In some instances the member has been secured in place by means of a locking screw which extends through the gland and clamps the member, but for secure fastening it is generally necessary to indent the member in order to provide a recess into which the locking screw can extend. However, some members have such thin walls that indention is impractical. Otherwise there is the danger of deforming or collapsing the member upon tightening the screw. In addition, engagement of the locking screw with the indention is difficult because of the fact that visual alignment is not possible, and tightening and loosening of one or more locking screws can be an awkward and time consuming procedure.

SUMMARY OF THE INVENTION

It is therefore an object of this invention to provide improved means for altering the distance to which an elongated member is inserted into a vessel through a wall opening, while preventing leakage of material through the opening. Other objects and advantages of the invention will become apparent from the following description and the appended claims.

In accordance with the present invention, a fluid-containing vessel having a longitudinally movable elongated member which inserts into the vessel through an opening in the wall thereof is provided with a stationary housing having an inner space through which the member is axially extendible. One end of the housing is attached to the wall of the vessel over the opening for the elongated member so that the inner space of the housing and the interior of the vessel are in communication with one another.

A clamp for the elongated member is located within the inner space of the housing and aligned axially therewith. The clamp has a plurality of rigid, spaced-apart fingers which are affixed to a mount having a passageway through which the elongated member is insertable. The clamp fingers extend longitudinally from the mount with respect to the axis of the passageway. Each of the fingers has an inwardly tapering end edge and is flexible toward the axis of the passageway upon application of an inward pressure to the end edge, and is self-recoverable from the flexure after removal of the pressure.

Inward flexure of the clamp fingers, for locking the elongated member in place, is accomplished by means of a compression member and adjustable force application means for pressing the clamp against the compression member. The compression member has a passageway to accommodate insertion of the elongated member and an outwardly tapering end edge that abuts the inwardly tapering end edges of the clamp fingers. The passageway of the compression member is aligned axially with respect to the passageway of the clamp mount, and the adjustable-force application means is adapted to move the clamp axially, so that the clamp fingers are flexed inward by pressure applied to the countertapered end edges of the compression member and the fingers. The compression member is, therefore, essentially nonyieldable to compressive forces applied to it through the clamp.

The adjustable-force application means can be a sleeve which inserts axially into the inner space of the stationary housing and can be provided with threads which engage a threaded section of the housing. By tightening the sleeve, the clamp and compression member can be pressed together to effect flexing of the fingers. Alternately, the sleeve may be pressed inwardly by means of a lever, or hydraulically. It will be understood that flexure of the clamp fingers may be effected by applying force to either the clamp or the compression member and that either the clamp or the compression member may be integral with the force application means.

Since the clamp alone is ineffective for blocking leakage of fluid through the inner space of the housing which surrounds the elongated member, the present invention also comprises a separate seal means for that purpose.

In operation, the elongated member is inserted through the passageways of the clamp and the compression member while sufficient pressure is applied to the clamp fingers to flex them inwardly so that they securely grip the elongated member and prevent longitudinal movement thereof. For longitudinal repositioning of the elongated member, the pressure on the fingers is relieved and they automatically recover from the flexure and release the member so that it is free to move back and forth within the housing. After repositioning, pressure is again applied to the fingers in order to lock the elongated member in place.

The end edges of the clamp fingers and the compression member can be provided with a straight taper so that the abutted edges are parallel, but more advantageously either or both edges can be arcuately tapered to facilitate sliding of the surfaces over one another when applying and releasing pressure on the clamp fingers.

While the invention is especially applicable to elongated members having a circular configuration, such as pipes and shafts, it will be understood that it can be adapted to other configurations, e.g. square, rectangular, triangular, hexagonal, etc. For convenience the clamp and the compression member can be aligned coaxially within the inner space of the stationary housing, but offcenter axial alignment may also be employed.

The compression member may be a sleeve which inserts into the inner space within the housing while being adapted for back and forth movement therein when the pressure against the clamp is released. Arranged thus, the compression member is retained within the inner space and immobilized therein, upon application of pressure to the clamp, by an abutment member within the housing. The abutment member may be an integral part of the housing or attached to it by threads. Similarly the compression member can be an immobile integral part of the stationary housing or firmly attached to it. When the compression member is separate and movable, the outer periphery of the seal means can be clamped between the compression member and the abutment member.

It should also be pointed out that the clamp fingers can extend longitudinally in both directions from the mount, in which case two compression members are employed for engaging each end of the clamp. In such an arrangement, at least one of the compression members can be an integral part of the adjustable-force application means.

DESCRIPTION OF THE PREFERRED EMBODIMENTS

Figure 1:
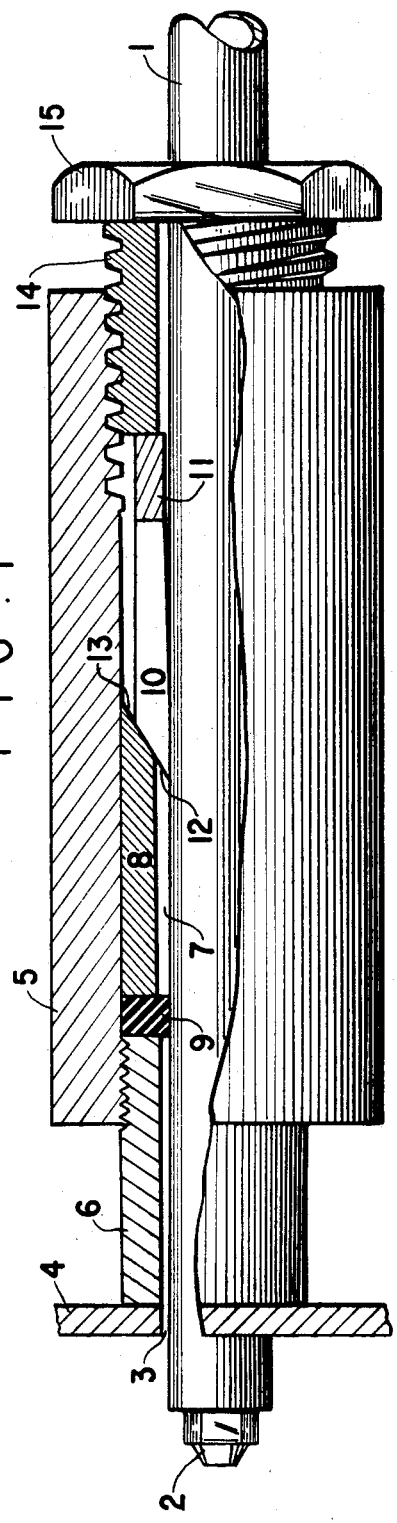
FIG. 1, a partly sectional side view, shows one embodiment of the invention wherein a longitudinally movable conduit extends into a process vessel.

In FIG. 1, a longitudinally movable conduit 1 for conveying liquid to an atomizer nozzle 2 extends through an opening 3 in the wall 4 of a process vessel. A stationary housing 5 is threadably connected to one end of a sleeve 6 which is affixed at the other end to the vessel wall around the opening 3. The stationary housing 5 has an inner space 7; and as shown in FIG. 1, the conduit extends through the stationary housing, the sleeve 6 and the opening 3, all of which are coaxially aligned. The compression member 8 is essentially a hollow cylinder which is square cut at one end and outwardly tapered at the other end. The compression member is aligned coaxially within the inner space 7 of the stationary housing and slidable therein. The threaded end of the sleeve 6 is the abutment member for the compression member, a packing ring 9 being clamped between the two.

Figure 5:
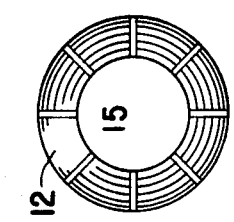
FIG. 5 is a sectional view of the clamp employed in the embodiment shown in FIG. 1.

The clamp, more clearly illustrated in FIG. 5, is located within the inner space 7 of the stationary housing and aligned coaxially therewith. The clamp fingers 10 extend longitudinally from the finger mount 11 toward the compression member 8, the fingers having inwardly tapering end edges 12 that abut the outwardly tapering end edge 13 of the compression member. The clamp is forced inward against the compression member by means of a threaded sleeve 14 which screws into the stationary housing and is aligned coaxially with the inner space therein. A nut 15 is employed for turning the sleeve 14 so that the pressure on the clamp can be adjusted for flexure and recovery of the clamp fingers and for seating of the packing ring 9. Other than a nut, the sleeve 14 can have a handle affixed thereto which permits turning of the sleeve by hand without having to use a wrench.

As seen in FIG. 1, the conduit 1 extends axially through the sleeve 14, clamp, compression member 8, packing ring 9, sleeve abutment member 6 and the opening 3 in the wall 4 of the processing vessel. The outside diameter of the conduit 1 is sized slightly smaller than the central passageway 15 in the clamp, thus minimizing the extent to which the clamp fingers must flex inwardly for gripping of the conduit, yet permitting free back-and-forth movement of the conduit when pressure on the clamp is released.

In operation, the atomizer tip 2 is maintained in position by tightening sleeve 14 so that the inwardly tapered end edges of the clamp fingers are forced axially inward against the outwardly tapering end edge of the compression member. The clamp is thus wedged into the compression member, causing the clamp fingers to flex inward against the conduit wall and grip it securely so that longitudinal movement is restrained. In addition to bringing pressure on the clamp, tightening of the sleeve 14 also urges compression member 8 toward the abutting sleeve 6 so that the packing ring 9 between the two is compressed, thus forcing the packing into firm contact with the wall of conduit 1 to form a seal that prevents leakage of material into or out of the vessel through the opening 3. To relocate the position of the atomizer tip 2 within the process vessel, the sleeve 14 is loosened to relieve pressure upon the clamp just sufficiently to permit longitudinal movement of the conduit while still exerting enough pressure to maintain the seal between the conduit 1 and the packing ring 9 so that the conduit can be moved longitudinally without substantial leakage of material into or out of the vessel.

FIG. 1 shows a compression member and clamp fingers which have abutting straight tapered end edges that are parallel to one another. The angle of the taper is not critical, but it will be appreciated that the angle should not be so small as to result in over insertion of the clamp within the compression member as would result in seizing, nor should the angle be so great that the clamp fingers are not effectively flexed inward by the application of pressure. Thus the angle should be such as to provide assured flexure and recovery of the fingers upon application and release of a moderate pressure, and although considerable variation is possible, angles of about 25° to about 40° have been successfully employed.

Figure 2:
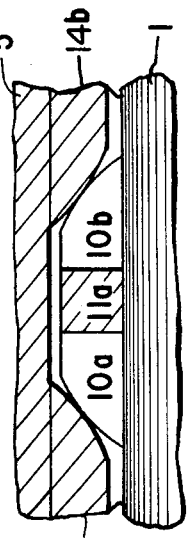
FIG. 2 is a partly sectional side view of the compression member and one of the clamp fingers, the compression member having a straight tapered end edge that abuts on an arcuately tapered end edge of the finger.
Figure 3:
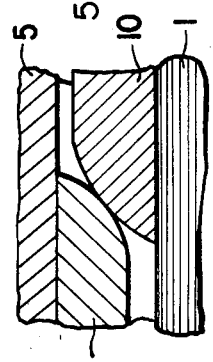
FIG. 3 is a partly sectional side view of the compression member and one of the clamp fingers, the end edges of both the compression member and the finger being arcuately tapered.

The end edge of either the clamp fingers or the compression member may be arcuately tapered to insure compressive abutment of the edges without seizure as would result in failure of the fingers to recover from flexure after the release of pressure. FIG. 2 shows a clamp finger with an arcuately tapered end edge while the end edge of the compression member is straight tapered. It will be understood, however, that the end edge of the compression member can be arcuately tapered while the fingers have a straight taper; or, both end edges can be arcuately tapered as shown in FIG. 3.

Figure 4:
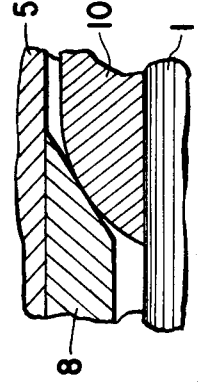
FIG. 4 is a partly sectional side view of a clamp which has fingers that extend longitudinally in both directions from the mount, two compression members abutting each end of the clamp.

In FIG. 4, the clamp has finers 10a and 10b which extend longitudinally in both directions from the finger mount 11a instead of in just one direction. In such a case, each end of the clamp can be abutted by a compression member, one of which is integral with the stationary housing as represented at 5a, and the other of which is integral with the tightening sleeve as represented at 14a. It will be appreciated that the compression member can also be integral with the stationary housing when the clamp fingers extend longitudinally only in one direction and, alternatively, the compression member can be nonintegral with the stationary housing 5, i.e. axially movable in the inner space of the housing when pressure against the clamp is released.

Figure 6:
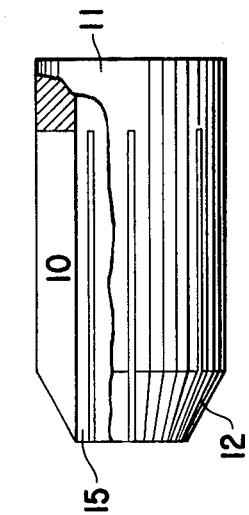
FIG. 6 is a side view of the clamp of FIG. 5.

A clamp which can be employed in the arrangement of FIG. 1 is more clearly illustrated in FIGS. 5 and 6. The clamp has a ring-shaped mount section 10 and integral fingers 11 which surround the passageway 16 through which the conduit 1 extends. It can be seen that the clamp can be made from a hollow metal cylinder by inwardly tapering one end thereof and by cutting a series of longitudinally extending slots through the wall of the cylinder. The width of the slots should be sufficient to permit inward flexure of the fingers to a distance necessary for griping of the conduit. The thickness of the wall of the cylinder and the character of the metal must be such as to permit the necessary flexure and recovery of the fingers.

It will be appreciated that the passageway 16 in the clamp will have a diameter which accommodates a conduit of one size, or within a narrow size range, so that significantly smaller conduits will require a clamp having a smaller passageway. Only the clamp and seal need be changed, however, since the other members retain their function without further alteration being required. The arrangement of FIG. 1 can be easily disassembled for changing, cleaning or replacing any of the members, including the seal. It will also be understood that the seal can be placed in locations other than between the compression member and the abutment member, e.g. between the clamp and the force-applying sleeve.

I claim:

1. In a fluid-containing vessel having a longitudinally movable elongated member which extends into the vessel through an opening in the wall thereof, means for altering the distance to which said member is inserted into the vessel while preventing leakage of material through said wall opening comprising, in combination:
   a. a stationary housing having an inner space through which said member is axially extendible, said housing being connected at one end to the wall of said vessel, the inner space of said housing being in communication with the interior of the vessel through said opening in the wall thereof,
   b. a clamp for the elongated member, said clamp having a mount with a passageway therein to accommodate insertion of the elongated member, a plurality of rigid, spaced-apart fingers affixed to said mount and extending longitudinally therefrom with respect to the axis of the passageway, the tips of the fingers having inwardly tapering end edges, the fingers being inwardly flexible toward the axis of said passageway and self-recoverable from the flexure, said clamp being located in the inner space of said housing and aligned axially therewith,
   c. a compression member having a passageway to accommodate insertion of the elongated member and an outwardly tapering end edge that abuts the inwardly tapering end edges of the finger tips, the passageway of said compression member being axially aligned with the passageway of said clamp mount, said compression member being essentially nonyieldable to compressive forces applied thereto through said clamp and being axially movable in the inner space of said stationary housing when pressure against the clamp is released, and the compression member being retained within the inner space and immobilized therein upon application of pressure to the clamp,
   d. adjustable-force application means for establishing, maintaining and releasing a pressure between said clamp and compression member which flexes the clamp fingers inwardly,
   e. sealing means between said housing and said elongated member for blocking leakage of material through the inner space of said housing, whereby the fingers flex inward and clamp the elongated member when the clamp is pressed against the compression member, thus preventing longitudinal movement of the elongated member, and the fingers recover from the flexure and release the elongated member when the pressure upon the clamp is released, thereby permitting longitudinal repositioning and subsequent restraint of said member without leakage of fluid in or out of the vessel.

2. The apparatus of claim 1 in which the tapered end edge of the compression member is parallel to the abutted tapered end edges of the clamp fingers.

3. The apparatus of claim 1 in which the end edges of the clamp fingers are arcuately tapered.

4. The apparatus of claim 1 in which the end edge of the compression member is arcuately tapered.

5. The apparatus of claim 1 in which the clamp and the compression member are aligned coaxially with the inner space of the stationary housing.

6. The apparatus of claim 1 in which the outer periphery of the seal means is clamped between the compression member and an abutment member within said stationary housing upon application of pressure to the clamp.

7. The apparatus of claim 1 in which the clamp, compression member and seal are adapted to clamping and sealing with an essentially cylindrical elongated member that is inserted into the stationary housing.

8. The apparatus of claim 1 in which the clamp fingers extend longitudinally in both directions with regard to the mount, and including separate compression members which engage each end of the clamp.

9. The apparatus of claim 8 in which one of the compression members is integral with said adjustable-force application means.

10. In a fluid-containing vessel having a longitudinally movable elongated member which extends into the vessel through an opening in the wall thereof, means for altering the distance to which said member is inserted into the vessel while preventing leakage of material through said wall opening comprising, in combination:
   a. a stationary housing having an inner space through which said member is axially extendible, said housing being connected at one end to the wall of said vessel, the inner space of said housing being in communication with the interior of the vessel through said opening in the wall thereof,
   b. a clamp for the elongated member, said clamp having a mount with a passageway therein to accommodate insertion of the elongated member, a plurality of rigid, spaced-apart fingers affixed to said mount and extending longitudinally therefrom with respect to the axis of the passageway, the tips of the fingers having inwardly tapering end edges, the fingers being inwardly flexible toward the axis of said passageway and self-recoverable from the flexure, said clamp being located in the inner space of said housing and aligned axially therewith,
   c. a compression member having a passageway to accommodate insertion of the elongated member and an outwardly tapering end edge that abuts the inwardly tapering end edges of the finger tips, the passageway of said compression member being axially aligned with the passageway of said clamp mount, said compression member being integral with said housing and essentially nonyieldable to compressive forces applied thereto through said clamp,
   d. adjustable-force application means for establishing, maintaining and releasing a pressure between said clamp and compression member which flexes the clamp fingers inwardly,
   e. sealing means between said housing and said elongated member for blocking leakage of material through the inner space of said housing, whereby the fingers flex inward and clamp the elongated member when the clamp is pressed against the compression member, thus preventing longitudinal movement of the elongated member, and the fingers recover from the flexure and release the elongated member when the pressure upon the clamp is released, thereby permitting longitudinal repositioning and subsequent restraint of said member without leakage of fluid in or out of the vessel.

11. The apparatus of claim 12 in which the tapered end edge of the compression member is parallel to the abutted tapered end edges of the clamp fingers.

12. The apparatus of claim 11 in which the end edges of the clamp fingers are arcuately tapered.

13. The apparatus of claim 11 in which the end edge of the compression member is arcuately tapered.

14. The apparatus of claim 11 in which the outer periphery of the seal means is clamped between an abutment member within said stationary housing and said adjustable force application means.

15. The apparatus of claim 11 in which the clamp fingers extend longitudinally in both directions with regard to the mount, and including separate compression members which engage each end of the clamp.

16. The apparatus of claim 15 in which one of the compression members is integral with said adjustable-force application means.